UNITED STATES PATENT OFFICE.

CHARLES T. PIERSON, OF RAMAPO, NEW YORK.

IMPROVEMENT IN PACKINGS FOR CAR-AXLE BOXES.

Specification forming part of Letters Patent No. 175,625, dated April 4, 1876; application filed January 18, 1876.

*To all whom it may concern:*

Be it known that I, CHARLES T. PIERSON, of Ramapo, in Rockland county, State of New York, have invented a certain new and useful compound for use especially in the washer or packing applied to car-axle boxes for the purpose of keeping them free from dust, and preventing waste of oil, but also in its more specific form useful for other packings, of which improvement the following is a full, clear, and exact description:

For the purpose indicated a packing or washer of peculiar character is needed, as the great vibration, play, and thrust of the axle under great pressure, combined with the fact that the packing is used out of doors, and subject to great changes of temperature, and to wet and dry weather, render all ordinary packings comparatively useless for the purpose. I have, therefore, invented a new composition, which is intended for this purpose, and for use as a scraper, as used within car-axle boxes, for preventing the escape of oil on or by way of the axle itself when in motion, and which composition is composed, primarily, of rubber or gum, wool, and plumbago, with other necessary ingredients, as hereinafter described.

In its best form the composition is composed of rubber, plumbago, sulphur, cork, and wool, or their equivalents, the two last ingredients being reduced to fiber, and mixed with the other ingredients in such manner as will readily suggest itself to persons in the habit of manufacturing rubber and other vegetable gums. The ingredients, being so mixed as to form a homogeneous compound, are then cast or molded under pressure in iron or metal molds of the desired shape, in a manner not necessary to explain, as it will be well understood by rubber-manufacturers, and a hard, durable, and elastic washer or scraper material is formed of the best qualities for the purpose indicated. It is intended to be applied at the rear of the box, (on the side next the car-wheel,) and kept snugly to the axle, without great pressure, and also as a scraper within the box, by the devices described in the patent of the Sanson Car-Axle-Lubricator Company, No. 154,194, granted on the 18th day of August, 1874, or similar devices, and, forming in its use as a washer a species of collar around the axle, will prevent the entrance of dust and dirt through the opening through which the axle enters, and, in connection with the scraper, prevents the escape of the oil or lubricant supplied to the box.

In the form above described, and as I have actually used the compound, I have found that about (30) thirty parts of rubber, (25) twenty-five of wool, (25) twenty-five of cork or wood fiber, (15) fifteen of plumbago, and (5) five of sulphur are the most advantageous proportions to combine the ingredients, although these proportions may be slightly varied in use.

The function of the rubber in such a composition is obvious. Its cohesive and elastic properties render it admirably adapted for packing purposes, while it has certain properties which do not permit of its use alone in this connection or in large proportion, being destructible in oil, or tending to soften when long exposed to its action, and under friction, as in the use here contemplated, is likewise disposed to adhere to the surface of the axle in contact with it, and to which as here used this packing, to be perfect, must be adapted to close tight without binding, and thereby generating heat to the axle, and which in itself is destructible to the packing. The rubber, in proportion as I use it, however, forms an admirable matrix or basis with which to combine other substances which overcome these properties, and when this is done in the manner in which I have succeeded in accomplishing the object by long and varied tests a packing or washer is obtained which fully accomplishes all that is desired of it.

In the compound caoutchouc may be substituted as an equivalent for rubber, and other gums may be used; but the rubber is a well-known type of these substances, and they will, therefore, suggest themselves to those accustomed to working in such substances.

The function of the plumbago in the compound is obvious, and depends upon its well-known lubricating qualities; but, if added in undue proportion, it tends to soften and disintegrate the other ingredients and destroy its usefulness, and renders the packing too easily affected by the changes of temperature and the chemical action of the oil, and the heat and pressure, to which, in use, it is subjected.

I have, therefore, found it expedient to employ as an ingredient of the mixture a considerable portion of wool or cotton, or such other fibrous material as may act as an equivalent of the wool, in the composition. This also serves to bind together the mixture, and forms a good substitute for rubber and plumbago in making up the required bulk of the packing. Being indestructible in oil, it serves to a great extent to make the mixture so; and while, as suggested, cotton or other fiber might serve to some extent as an equivalent for it in the composition, I prefer the wool on account of its softness and compressibility of itr fibers, and the property which they have of clinging to each other.

If wool alone is combined with the rubber and plumbago, the compound would still be too soft and lack density, and is in practice found to expand or be affected by the temperature, and likewise subject to rapid wear by the axle; and to overcome these defects I use with wool fiber about equal proportions of cork or wood fiber. The cork serves to a certain extent the same function as the wool in nullifying the objectionable features of the rubber by its substitution for the latter. It is elastic and of finer fiber than most others; it adds to the mixture a certain kind of hardness and fineness of texture that is desirable, and which cannot be secured by the use of wool alone, or any of the similar fibers. Other wood fiber might to some extent serve as equivalent for the cork; but it is believed to be the best for the purpose.

To increase the density, and thereby render the material hard, and in every way tending to make it more durable, and independent of the changes of temperature to which, in use, it is subjected, I add to the mixture a small proportion of sulphur.

Compounds of rubber and plumbago are perhaps not new; but it is believed that none have hitherto been made which have been or could be successfully applied to the purposes described, as a material for this purpose must, as before indicated, have properties which are not needed elsewhere.

While the sulphur will be found to be an improvement when added to the compound, it is still not necessary to form a good packing for many purposes, and the compound composed of rubber, plumbago, wool, and cork, or their equivalents, will be found to have many of the useful properties before described. Moreover, the use of cork, while very valuable, is not necessary, and by leaving this out, and proportionately increasing the amounts of plumbago and wool, or their respective equivalents, in the compound, it will also be found to be a very useful compound of the kind described.

My invention, then, may be said to consist in the forming of a homogeneous compound intended, primarily, for packings for car-axle boxes, but useful for other purposes, and consisting of the mixture of rubber, plumbago, and wool, and their respective equivalents, and in the addition thereto of cork or wood fibers and sulphur, or cork alone, or their equivalents.

I claim as my invention—

1. The new composition of matter composed, essentially, of rubber, plumbago, and wool, or their respective equivalents, mixed so as to form a homogeneous compound, substantially as and for the purpose described.

2. The new composition of matter composed of rubber, plumbago, sulphur, wool, and cork, or their respective equivalents, mixed so as to form a homogeneous compound, substantially as and for the purpose described.

3. The new composition of matter composed of rubber, plumbago, wool, and cork, or their respective equivalents, mixed so as to form a homogeneous compound, substantially as and for the purpose described.

CHARLES THEODORE PIERSON.

Witnesses:
 SIDNEY DE KAY,
 WYLLYS HODGES.